(12) United States Patent
Hansen et al.

(10) Patent No.: US 12,403,591 B2
(45) Date of Patent: Sep. 2, 2025

(54) GRIPPING SYSTEM FOR AN AUTONOMOUS GUIDED VEHICLE

(71) Applicant: MOBILE INDUSTRIAL ROBOTS A/S, Odense SOE (DK)

(72) Inventors: Lars Hjorth Hansen, Tommerup (DK); Mikkel Steen Pedersen, Silkeborg (DK)

(73) Assignee: MOBILE INDUSTRIAL ROBOTS A/S, Odense SOE (DK)

( * ) Notice: Subject to any disclaimer, the term of this patent is extended or adjusted under 35 U.S.C. 154(b) by 241 days.

(21) Appl. No.: 17/927,213

(22) PCT Filed: Jun. 1, 2021

(86) PCT No.: PCT/EP2021/064668
§ 371 (c)(1),
(2) Date: Nov. 22, 2022

(87) PCT Pub. No.: WO2021/249827
PCT Pub. Date: Dec. 16, 2021

(65) Prior Publication Data
US 2023/0202032 A1    Jun. 29, 2023

(30) Foreign Application Priority Data
Jun. 9, 2020 (EP) .................................... 20178999

(51) Int. Cl.
*B25J 9/16*    (2006.01)
*B25J 9/00*    (2006.01)
(Continued)

(52) U.S. Cl.
CPC ............. *B25J 9/162* (2013.01); *B25J 9/0009* (2013.01); *B25J 9/1669* (2013.01); *B25J 11/008* (2013.01);
(Continued)

(58) Field of Classification Search
CPC ..... A61G 2203/22; B25J 9/162; B25J 9/0009; B25J 9/1669; B25J 11/008; B25J 13/081;
(Continued)

(56) References Cited

U.S. PATENT DOCUMENTS 4,305,601 A   12/1981  Berge
5,518,260 A    5/1996  Grignon
(Continued)

FOREIGN PATENT DOCUMENTS

CN   101795141 A   8/2010
CN   203844860 U   9/2014
(Continued)

OTHER PUBLICATIONS

DE_102016208456_B4_I_translation (Year: 2019).*
(Continued)

*Primary Examiner* — Kyle T Johnson
(74) *Attorney, Agent, or Firm* — ArentFox Schiff LLP

(57) ABSTRACT

A gripping system for an autonomous guided vehicle (AGV) and such AGV are disclosed herein. The gripping system for automated gripping and pulling/pushing a cart comprises a unique gripping end effector ensuring controlled steering of the cart while allowing rolling of the cart relative to the body of the AGV. The end effector comprises means for indication of state of connection between the cart and the gripping system, ensuring a reliable, safe and efficient cart gripping and pulling operation.

20 Claims, 2 Drawing Sheets

(51) Int. Cl.
  B25J 11/00 (2006.01)
  B25J 13/08 (2006.01)
  B25J 15/02 (2006.01)
  B25J 18/00 (2006.01)
(52) U.S. Cl.
  CPC .......... *B25J 13/081* (2013.01); *B25J 13/086* (2013.01); *B25J 15/0206* (2013.01); *B25J 15/0253* (2013.01); *B25J 18/007* (2013.01)
(58) Field of Classification Search
  CPC .. B25J 13/086; B25J 15/0206; B25J 15/0253; B25J 18/007; B25J 5/007; B60D 2001/005
  See application file for complete search history.

(56) References Cited

U.S. PATENT DOCUMENTS

| | | | |
|---|---|---|---|
| 6,113,343 A * | 9/2000 | Goldenberg | B25J 19/005 239/587.2 |
| 6,148,255 A | 11/2000 | van der Lely | |
| 6,244,366 B1* | 6/2001 | Otterson | B62D 51/04 180/19.1 |
| 6,435,803 B1 | 8/2002 | Robinson | |
| 7,134,515 B2* | 11/2006 | Lenkman | B62D 51/04 180/19.1 |
| 7,219,754 B2* | 5/2007 | Johnson | B60D 1/167 280/402 |
| 7,571,914 B2 | 8/2009 | Holtan et al. | |
| 7,857,237 B2 | 12/2010 | Vickers et al. | |
| 7,857,342 B2* | 12/2010 | Holtan | B60D 1/00 280/415.1 |
| 7,898,470 B2 | 3/2011 | Heraud et al. | |
| 7,996,109 B2 | 8/2011 | Zini et al. | |
| 8,360,459 B2 | 1/2013 | Holtan et al. | |
| 8,613,339 B2 | 12/2013 | Baba | |
| 8,684,373 B2* | 4/2014 | Holtan | B62B 5/0006 280/47.11 |
| 9,288,938 B2 | 3/2016 | Cavender-Bares et al. | |
| 9,669,857 B1 | 6/2017 | Rainey | |
| 10,017,322 B2 | 7/2018 | High et al. | |
| 10,233,056 B1* | 3/2019 | Brauer | B62B 3/06 |
| 10,666,617 B2* | 6/2020 | Jacobsen | B25J 5/007 |
| 11,008,033 B2* | 5/2021 | Bondaryk | B62B 5/0003 |
| 12,134,286 B1* | 11/2024 | Adams | B60D 1/00 |
| 2003/0127813 A1* | 7/2003 | Lenkman | B62D 51/04 280/43.1 |
| 2004/0093650 A1 | 5/2004 | Martins et al. | |
| 2004/0245030 A1* | 12/2004 | Holtan | B62B 3/1404 180/19.1 |
| 2004/0256166 A1 | 12/2004 | Holtan et al. | |
| 2005/0098362 A1* | 5/2005 | Johnson | B60D 1/00 180/11 |
| 2006/0042842 A1 | 3/2006 | Berg et al. | |
| 2006/0175134 A1* | 8/2006 | Schonauer | B66F 9/18 187/237 |
| 2006/0232043 A1* | 10/2006 | Inoue | B60D 1/54 280/515 |
| 2008/0230286 A1 | 9/2008 | Turner | |
| 2011/0005846 A1 | 1/2011 | Page et al. | |
| 2012/0139209 A1 | 6/2012 | Weiss | |
| 2012/0207574 A1* | 8/2012 | La Rovere | B25J 15/0616 414/751.1 |
| 2014/0102239 A1* | 4/2014 | Umeno | B25J 9/0087 294/213 |
| 2015/0203140 A1* | 7/2015 | Holtan | B60D 1/36 280/442 |
| 2015/0360882 A1 | 12/2015 | Girtman | |
| 2018/0281178 A1* | 10/2018 | Jacobsen | B25J 13/086 |
| 2018/0362270 A1 | 12/2018 | Clucas et al. | |
| 2019/0033837 A1* | 1/2019 | Zanger | G05B 19/41865 |
| 2019/0126697 A1* | 5/2019 | Adachi | B61B 13/00 |
| 2019/0248007 A1* | 8/2019 | Duffy | B25J 9/1653 |
| 2019/0269223 A1* | 9/2019 | Harding | A41G 5/02 |
| 2020/0108496 A1* | 4/2020 | Bidram | B25J 9/042 |
| 2020/0128757 A1* | 4/2020 | Bidram | B25J 13/086 |
| 2020/0315099 A1* | 10/2020 | Bidram | B25J 9/1679 |
| 2022/0063085 A1* | 3/2022 | Chintamani | B66F 9/18 |
| 2022/0080793 A1* | 3/2022 | Bangalore Srinivas | B25J 5/007 |
| 2022/0126438 A1* | 4/2022 | Cristache | B25J 13/006 |
| 2023/0150321 A1* | 5/2023 | List | G05D 1/0212 701/25 |
| 2023/0192168 A1* | 6/2023 | Hall | B60P 9/00 280/79.2 |
| 2023/0202032 A1* | 6/2023 | Hansen | B25J 11/008 700/245 |

FOREIGN PATENT DOCUMENTS

| | | | | |
|---|---|---|---|---|
| CN | 107032141 A | * | 8/2017 | ............. B25J 11/00 |
| CN | 110666815 A | * | 1/2020 | |
| CN | 112295134 A | * | 2/2021 | ............. A62B 99/00 |
| CN | 114800425 A | * | 7/2022 | |
| DE | 102016208456 B4 | * | 1/2019 | ......... B25J 15/0061 |
| EP | 1867500 B1 | | 7/2009 | |
| EP | 2108563 A2 | | 10/2009 | |
| GB | 2436712 A | | 10/2007 | |
| KR | 102729338 B1 | * | 11/2024 | ............... B60D 1/62 |
| WO | 2006/089071 A2 | | 8/2006 | |
| WO | 2015/047195 A1 | | 4/2015 | |

OTHER PUBLICATIONS

The_European_Robotic_Arm_A_high_performance_mechanism (Year: 2014).*
CN-107032141-A translation (Year: 2017).*
CN-110666815-A translation (Year: 2020).*
CN-112295134-A translation (Year: 2021).*
CN-114800425-A translation (Year: 2022).*
KR-102729338-B1 translation (Year: 2024).*
development_of_sensor_controlled_convertible_cart (Year: 2020).*
"MIR Fleet Reference Guide," Mobile Industrial Robots A/S, Odense, SØ, Ver. 1.0, (Jan. 2017), 32 pages.
International Preliminary Report on Patentability in Application No. PCT/EP2021/064668 dated Dec. 13, 2022, 7 pages.
International Search Report and Written Opinion in Application No. PCT/EP2021/064668 dated Sep. 7, 2021, 9 pages.
Extended European Search Report in Application No. 20178999.7 dated Dec. 16, 2020, 7 pages.
"MIR 500 User Guide," Mobile Industrial Robots A/S, Odense, SØ, Ver. 1.3, (Sep. 2019), 100 pages.
"MIR 100 User Guide," Mobile Industrial Robots A/S, Odense, SØ, Ver. 1.1, (Aug. 2018), 44 pages.
"MIR 100 User Guide," Mobile Industrial Robots A/S, Odense, SØ, Ver. 1.0, (Nov. 2017), 39 pages.
File History of EP3922417, downloaded Mar. 3, 2025. 111 pages.
Office Action issued in U.S. Appl. No. 15/566,516, mailed Oct. 24, 2019. 10 pages.

* cited by examiner

GRIPPING SYSTEM FOR AN AUTONOMOUS GUIDED VEHICLE

This application is a U.S. national stage entry of PCT application no. PCT/EP2021/064668 which was filed on Jun. 1, 2021. PCT application no. PCT/EP2021/064668 claims priority to European application no. EP20178999.7 which was filed on Jun. 9, 2020. This application claims priority to both PCT application no. PCT/EP2021/064668 and to European application no. EP20178999.7. Both PCT application no. PCT/EP2021/064668 and European application no. EP20178999.7 are incorporated into this this application by reference.

FIELD OF THE INVENTION

The present invention relates to a gripping system for an autonomous guided vehicle for docking and undocking with a cart and for pulling and pushing the cart. More specifically the invention relates to a manipulator type gripping system.

BACKGROUND OF THE INVENTION

Transportation of articles within a structure or between multiple structures has posed, to some degree, a problem. For example, hospitals with over 500 beds, need to use a considerable number of working hours on physical movement of linen, medical specimens, pharmaceuticals, blood products, patient charts, x-rays, and meals. Many transportation options exist today as commercially available products, for example, conveyor belts, pneumatic tubes, gimbled carts, and mobile robots. Mobile robots and in particular Autonomous Guided Vehicles (AGV) have been equipped with a drive system under computer control, which allows autonomous guidance between multiple locations. Towing of carts with a rear mounted towing apparatus on AGV's are well known in the art. Commonly a commercial hitch and ball are mounted at one end of the AGV, usually the rear, whereat a cart comprising a releasable socket and a tow bar is connected. U.S. patent application Ser. No. 15/566,516 (publication number US2018/0281178) discloses a mobile robot system comprising an AGV and a gripping device mounted on the AGV. The AGV comprises a wheel-driving motor, an on-board computer, means for navigation, orientation and maneuvering in an environment with moving obstacles, a sensor system, and a wireless communication system for receiving and sending signals. The gripping system comprises a base for attaching the gripping system to the AGV, an arm and a gripper for gripping a cart. Main challenge for such gripping system is that position of the cart pulling AGV relative to the cart must be very precise in order to be able to grip the cart. This may require several attempts of docking and re-docking, and/or it is required that the docking be done at a slow speed. Another challenge of the prior art is that there is no safe indication of whether the gripper is in a correct alignment with to the connecting part of the cart before and/or while the gripping mechanism is activated. This can lead to an incorrect/weak coupling between the gripping device and the cart, and may lead to necessity of additional coupling attempts, increased wear and tear of the coupling mechanism, and to a situation where the cart is lost during transport.

A further challenge with the prior art solutions is that there is no safe indication of whether a cart is correctly decoupled from the cart-pulling vehicle. This can lead to situations where a cart is accidently still attached to the cart-pulling vehicle while the vehicle is in a "no-cart" driving mode and does not consider the extra foot print of the accidently attached cart while navigating around obstacles and structural elements.

It is the object of the present invention to improve upon the prior art and provide vehicle gripping system for an AGV with a safe, reliable and quick gripping mechanism and an AGV with such a system. A further object of the invention is to improve the possibility to grip a variety of carts, which may or may-not be specifically designed for automatic transport, in a smooth manner for a safe pulling or pushing operation. A further object is to provide a safer operation of the AGV with the gripper system when no cart is supposed to be attached.

SUMMARY OF THE INVENTION

According to one aspect of the invention, a gripping system 1 for an autonomous guided vehicle (AGV) is disclosed. The gripping system 1 comprises a base 2 for attaching the gripping system 1 to a body 4 of the AGV, an arm 6 for manipulating an end effector 8 for gripping a cart for towing or pushing by the AGV. The arm 6 at one end is pivotally attached to the base 2, allowing a yaw motion of the arm 6 relatively to the AGV. At the other end, the arm 6 is provided with an end effector 8 being attached to the arm 6. Height of the end effector 8 is adjusted by the actuator 14 of the arm 6.

The end effector 8 is attached to the arm 6 via a pivoting connection 10. This allows a roll motion while limiting a yaw motion of the end effector 8 relatively to the arm 6. Two sensor arms 20a, 20b of the end effector 8 are adapted to cause the end effector 8 to pivot around its pivoting connection 10 if only one of the sensors arms 20a, 20b is pressed against a connecting part of the cart. The sensor arms 20a, 20b are further adapted to activate sensors 22a, 22b and when pressed against a connecting part of the cart, whereby signals are send to a control system of the gripping device, in order to indicate whether the end effector is in a correct position for the clamp force to be applied against the connecting part of the cart. The end effector 8 is provided with a hook 11 and a plurality of brackets 13a, 13b adapted for applying a clamping force on a part of the cart frame by moving the hook 11 in the direction of the brackets 13a, 13b. A further sensor activating element 11a is attached to the hook 11 for activating a further sensor 23 attached to a front face 21. When the sensor 23 is activated, it sends a signal to the control system of the gripping device, indicating a fully contracted hook 11. According to another aspect of the invention an autonomous guided vehicle comprising the gripping system 1 is disclosed. The autonomous guided vehicle comprises drive wheels, a robot body 4 mounted on said drive wheels, a control system utilizing a navigational system, and a gripping system 1 mounted on said robot body 4 for coupling the cart to said vehicle. The AGV further comprises at least one proximity sensor 4.1, 4.2 mounted on the robot body 4. The control system is coupled to said at least one proximity sensor 4.1, 4.2 for adjusting calculated robotic position and detecting any obstacles.

BRIEF DESCRIPTION OF THE DRAWINGS

Features of the invention believed to be novel and inventive are set forth with particularity in the appended claims. The invention itself, however, may be best understood by reference to the following detailed description of the invention, which describes exemplary embodiments, given in non-restrictive examples of the invention, taken in conjunction with the accompanying drawings, in which:

Preferred embodiments of the invention will be described herein below with reference to the drawings. Each figure contains the same numbering for the same or equivalent element.

DETAILED DESCRIPTION OF THE INVENTION

Numerous specific details are presented in order to provide a complete and comprehensible description of the invention embodiment. However, the person skilled in art will understand that the embodiment examples do not limit the application of the invention which can be implemented without these specific instructions. Well-known methods, procedures and components have not been described in detail for the embodiment in order to avoid any misleading. Furthermore, this description should not be constraining the invention to the given embodiment examples but only be considered as one of possible implementations of the invention.

Figure 1:
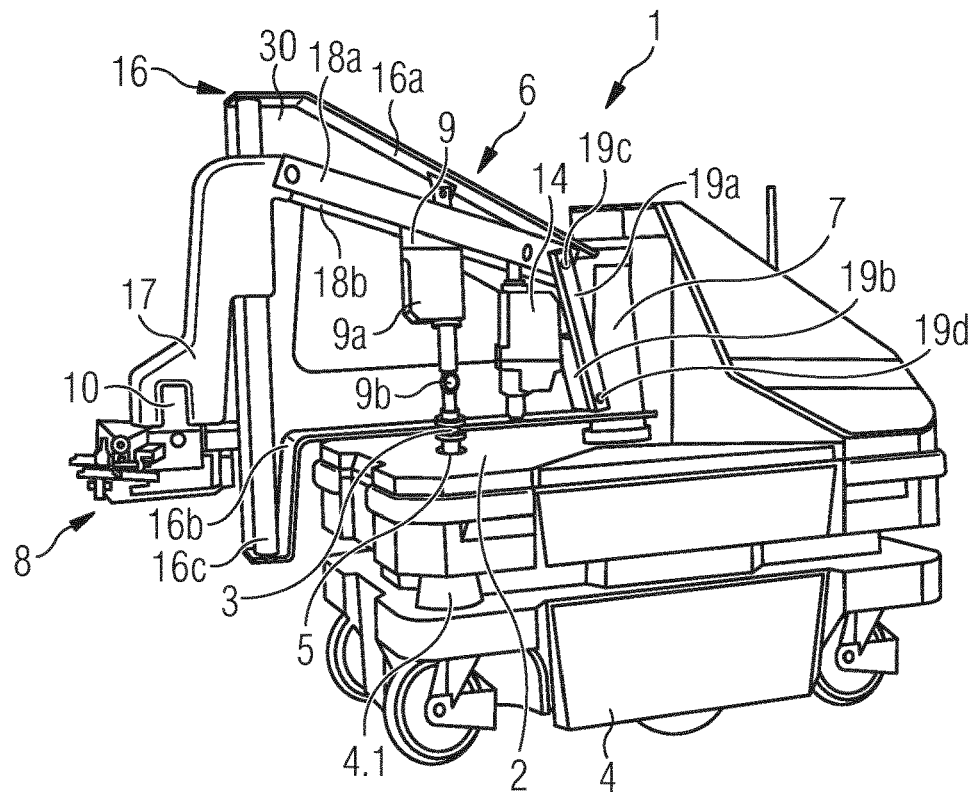
FIG. 1 shows the gripping system according to the invention mounted on an AGV.
Figure 2:
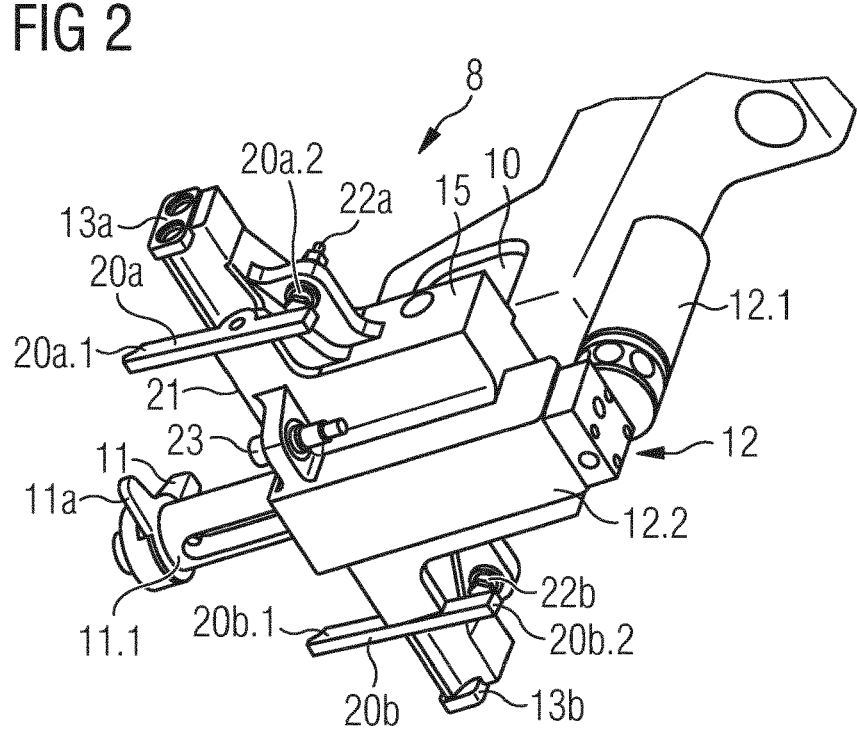
FIG. 2 shows the end effector of the gripping system according to the invention.
Figure 3:
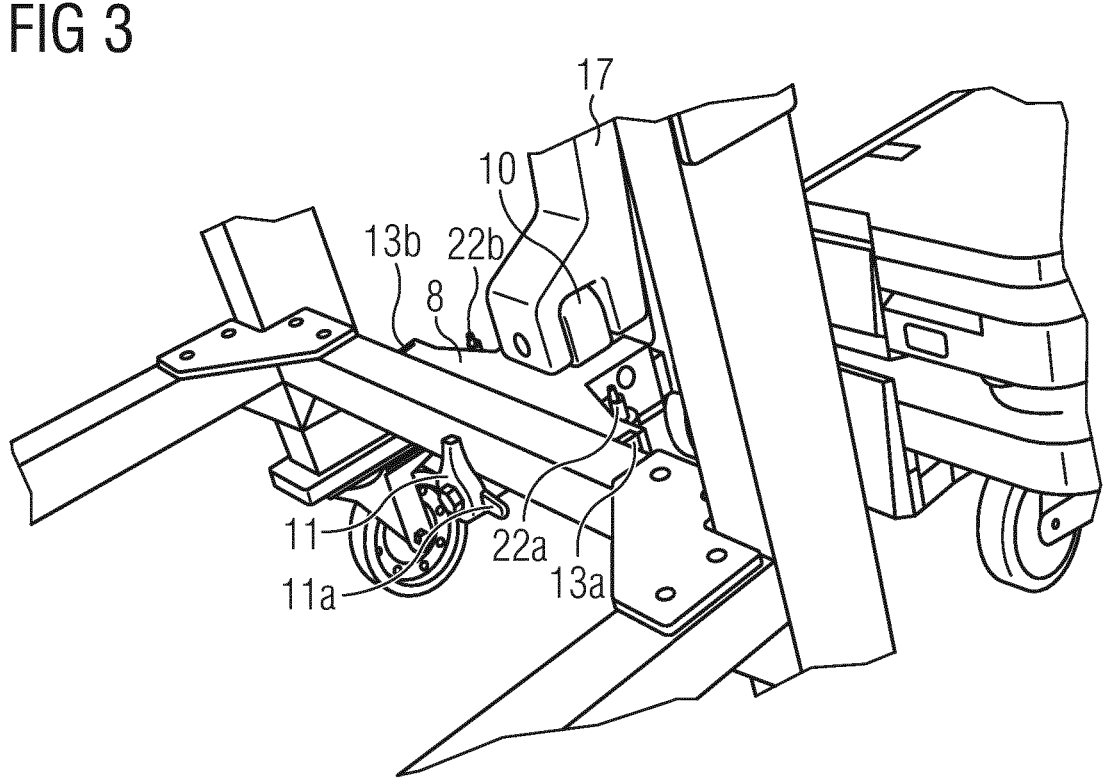
FIG. 3 shows the end effector of the gripping system according to the invention gripping an element of a cart frame.

FIG. 1 shows a gripping system 1 for an AGV. The gripping system 1 comprises a base 2, an arm 6 and an end effector 8 with sensors 23, 22a, 22b.

The base 2 comprises means, for example bolt holes, for attaching the base 2 to the AGV, an electrical interface (not shown) for connecting the gripping system to the AGV for the AGV to be able to control the gripping system. The base 2 may comprise a section 5, for example a recess or an opening, for interaction with the gripping system arm's 6 securing means 9 for securing the arm 6 in a fixed position when such position is needed. The base 2 further comprises means 7 for attaching the arm 6 to the base 2, for example a vertical shaft. The arm's attachment means 7 is configured to receive the arm 6 for it to be able to at least partly swivel around the vertical axis of the attachment point i.e. yaw relatively to the body 4 of the AGV.

The arm 6 further comprises a frame 16. The frame 16 at one end is attached to the means 7 for attaching the arm 6 to the base 2. Opposite end of the frame 16 has an end effector 8 attached thereto. The frame 16 may comprise an upper frame element 16a and lower frame element 16b. The upper frame element 16a and/or the lower frame element 16b at one end are attached to the means 7 for attaching the arm 6 to the base 2 and at the opposing end are attached to a sliding bar 16c. The frame 16 is preferably rigid. The arm 6 further comprises an actuator 14 adapted to adjust the angle of a lifting bar 18a, 18b relative to the horizontal plane and thereby adjust height of a sliding element 17 as well as the height of the end effector 8. The arm actuator 14 at one end is fixed to the lower frame element 16b and at another end is fixed to the lifting bar 18a or a set of lifting bars 18a, 18b. Each of the lifting bars 18a, 18b are at their one end pivotally attached to a first end of respective support bars 19a, 19b at attachment points 19c. Each of the support bars 19a, 19b at a second end pivotally attached to the lower frame element 16b at attachment points 19d. The lifting bars 18a, 18b are at a respective second end pivotally attached to the sliding element 17. The sliding element 17 is sliding up and down the sliding bar 16c when the arm 6 actuator 14 acts upon the lifting bars 18a, 18b. The sliding element 17 is connected to the end effector 8 via a pivoting connection 10. The pivoting connection 10 allows the end effector 8 to partly roll relatively to the base 2 and the body 4 of the AGV.

The arm 6 comprises securing means 9 for locking the arm 6 in a sideways stationary and stable position with respect to the body 4 of the AGV. The locking means 9 may be any electrically controllable mechanism. The securing means 9 preferably comprises a locking actuator 9a and a pin 9b which, when actuated protrudes from the frame 16 of the arm 6 towards the base 2 of the gripping system and into an opening 5 in the base 2 and/or in the frame of the AGV. The actuator 9a is preferably secured at a first end to the upper frame element 16a and at a second end to the lower frame element 16b, and is preferably situated between lifting bars 18a, 18b. In a preferred embodiment the actuator 9a is secured to the lower frame element 16b via a pin 9b by inserting the pin 9b into an opening 3 in the lower frame element 16b. While the arm 6 is not locked by the locking means the pin 9b remains inserted into the opening 3 in a retracted position. During locking of the arm 6, the actuator 9a extends the pin 9b through the opening 3 and further into the opening 5 in the base 2 and/or in the frame of the AGV. When locked, the arm 6 is in parallel to the centerline of the body 4 of the AGV. During unlocking of the arm 6, the actuator 9a retracts the pin 9b from the opening 5 in the base 2 and/or in the frame of the AGV.

The arm 6 may further comprise protecting shields 30 on both sides of the arm 6.

The end effector 8 is connected to the sliding element 17 via a pivoting connection 10 for a substantially free pivoting motion at a pivoting connection 10. The vertical position of the end effector 8, relatively to the sliding bar 16c is adjusted by sliding the sliding element 17 on the sliding bar 16c. The end effector 8 further comprises a hook 11 for gripping a part of a cart frame and is attached to one end of an elongated element 11.1. The elongated element 11.1 is movable linearly by actuation means 12, such as a linear actuator, so that part of the cart frame when hooked is secured between the hook 11 and front face 21 of the end effector 8. The actuation means 12 of the hook 11 preferably comprises a driving part 12.1 and a guiding part 12.2 for accommodating, moving and guiding the elongated element 11.1 for moving the hook 11. The guiding part 12.2 is preferably disposed inside bottom part of a frame 15 of the end effector 8. The driving part 12.1, such as a motor for driving the actuator is preferably positioned near the sliding member 17 and upwards relatively from the guiding part 12.2. The hook 11 further comprises a sensor activating element 11a. The sensor activating element 11a activates a sensor 23 positioned essentially on the front face 21 of the end effector 8, approximately opposite the hook 11. The sensor 11a is activated whenever the hook 11 is moved into a completely closed position by the hook actuation means 12. This ensure that the control system of AGV receives information that the hook 11 has moved into a completely closed position when there is no cart or other element accidentally attached to the hook 11. Accordingly, the AGV can safely switch to a no-cart operation mode. Two supporting brackets 13a, 13b are positioned laterally at the front face 21, right and left of the hook 11, respectively. Together with the hook 11, the supporting brackets 13a, 13b provide a clamp force against a connecting part of the cart. The end effector 8 is further provided with side sensors 22a, 22b positioned in the frame 15 of the end effector 8. The side sensors 22a, 22b are preferably pressure sensors. Each of the side sensors 22a, 22b are positioned between the respective bracket 13a, 13b and a centerline of linear motion of the hook 11. Each of the side sensors 22a, 22b are activated by a respective sensor arm 20a, 20b pivotally attached under the frame 15 of the end effector 8 and positioned between a respective bracket 13a, 13b and a centerline of linear motion of the hook 11. First end 20a.1, 20b.1 of each sensor arm 20a, 20b is protruding from the front face 21 of the end effector 8 so that when the end effector 8 starts gripping a connecting part of the cart each sensor arm 20a, 20b is pressed downwards by the connecting part of the cart when the end effector 8 is lifted upwards against the connecting part of the cart. Pivoting motion of each sensor arm 20a, 20b lifts second end 20a.2, 20b.2 of respective sensor arm 20a, 20b thereby activating the respective pressure sensor 22a, 22b. When the end effector 8 is entirely disengaged from the connecting part of the cart the activating elements 11a, 20a, 20b of each of the end effector sensors 23, 22a, 22b are disengaging from the sensors 23, 22a, 22b thus indicating that the end effector 8 is disengaged from the cart frame.

During engagement of the end effector 8 and the cart frame, the end effector 8 is lifted against the cart connecting part of the cart. If the plane of the brackets 13a, 13b is different from the plane of the connecting part of the cart, one of the two sensor arms 20a, 20b is first pressed against the connecting part of the cart. This causes the end effector 8 to pivot around its pivot point at the pivoting connection 10 and thereby to align with the plane of the connecting part of the frame of the cart until both sensor arms 20a, 20b are in touch with the connecting part of the frame of the cart and eventually both side sensors 22a, 22b are activated. The two side sensors 22a, 22b are adapted to send signals to the control system of the AGV and the control unit is adapted to stop further lifting of the end effector 8 when both side sensors 22a, 22b are activated.

While the end effector 8 and the connecting part of the frame of the cart are aligned, the control-system sends a signal to the hook 11 actuation means 12 to move the hook 11 into a closing position and thereby pressing the connecting part of the cart against the brackets 13a, 13b.

While being in the operational mode with a cart attached, the AGV and/or the cart may drive on an uneven surface and roll relatively to each other. Had the connection between the frame of the cart and the gripping system been stiff in all directions, there would have been a risk of twisting between the hook/brackets and the connecting part of the cart and thereby a risk of losing the cart and/or damaging the hook/brackets and/or the connecting part of the cart.

On the other hand, had the connection between the gripping system and the frame of the cart been flexible in all directions (e.g. a ball coupling), the ability of precise steering of the cart had been lost.

With the end effector 8 being pivotally connected to the sliding element 17 at the pivoting connection 10, the cart and the body 4 of the AGV can partly roll relatively to each other without the mechanical connection between them being twisted or stressed.

When the cart is attached to the gripping system 1 the arm 6 is preferably in its center position relative to the AGV. The control system of the AGV identifies the cart by help of a camera/sensor and has stored information about of height and position of the connecting part/frame of the identified cart. The control system adjusts the height of the end effector 8 so that the hook 11 is at a height, which is low enough to let the hook 11 pass under the cart frame/attachment part. The AGV drives itself to a position in front of the cart so that the end effector 8 is close to the frame/attachment part. The hook 11 is driven outwards. The end effector 8 is lifted and the hook 11 is driven inwards until it together with the brackets 13a, 13b provides a gripping force on the cart frame.

The construction ensures that the substantially same pulling forces can be transferred at different heights of the gripping portion, so that different type of cart can be pulled. Further the risk of tipping of the AGV is minimized.

Another aspect of the invention is to provide an AGV with the gripping system 1 as disclosed above. The AGV for towing or pushing a wheeled cart using the gripping system 1 according to the first aspect of the invention comprises drive wheels, a robot body 4 mounted on said drive wheels, a control system utilizing a navigational system. The AGV further comprises proximity sensors 4.1, 4.2 mounted on the robot body 4 for 270 degrees observation around the robot body 4. One proximity sensor 4.1 is positioned at the back of the robot body 4, in a corner. The other proximity sensor 4.2 is positioned in the front of the robot body 4 in a corner. The back part is where the cart is attached, and the front part is on the opposite side of the robot body 4. The control system is coupled to the proximity sensors 4.1, 4.2 for adjusting the calculated robotic position and for detecting any obstacles.

In a particularly preferred embodiment of the present invention, the navigational system includes an automatic control and guide system for reaching a given target and at the same time avoid collision with the surroundings.

Through the disclosure AGV stands for Autonomous Guided Vehicle.

Although numerous characteristics and advantages together with structural details and features have been listed in the present description of the invention, the description is provided as an example fulfilment of the invention. Without departing from the principles of the invention, there may be changes in the details, especially in the form, size and layout, in accordance with most widely understood meanings of the concepts and definitions used in claims.

The invention claimed is:

1. A gripping system for a vehicle, the gripping system comprising:
    a base for attachment to the vehicle;
    an arm for manipulating an end effector;
        the end effector for gripping a cart to be towed or to be pushed by the vehicle, the end effector being attached to the arm by a pivoting connection configured to enable a roll motion of the end effector relative to the arm and to limit a yaw motion of the end effector relative to the arm, and
        the end effector comprising a first sensor arm and a second sensor arm, the first sensor arm for contacting the cart, the end effector being configured to move in response to the first sensor arm contacting the cart until the second sensor arm contacts the cart;
    wherein the arm comprises a first end and a second end, the first end being pivotally attached to the base to enable yaw motion of the arm relative to the vehicle, and the second end being connected to the end effector; and
    an actuator configured to adjust a height of the end effector.

2. The gripping system of claim 1, where the end effector is configured so that, when the first sensor arm contacts a connecting part of a frame of the cart, the end effector pivots around the pivoting connection to the arm until the second sensor arm contacts the connecting part of the frame of the cart.

3. The gripping system of claim 2,
wherein the first sensor arm and the second sensor arm are configured to activate respective sensors to indicate that the end effector is in a correct position to apply a clamp force to the connecting part of the frame of the cart.

4. The gripping system of claim 3, wherein each of the first sensor arm and the second sensor arm comprises a first end protruding from a front face of the end effector and a second end for interacting with a respective sensor of the sensors.

5. The gripping system of claim 4, wherein the end effector comprises:
a hook; and
brackets configured to apply a clamp force on the connecting part of the frame of the cart by moving the hook in a direction towards the front face of the end effector using a hook actuator.

6. The gripping system of claim 5, wherein the end effector comprises a sensor, the sensor being responsive to an activating element attached to the hook to send a signal to a control system indicting a fully retracted hook.

7. The gripping system of claim 1, wherein the arm comprises securing means for restricting sideways motion of the arm; and
wherein the base comprises a section for interacting with the securing means to secure the arm relative to the base.

8. The gripping system of claim 7, wherein the section of the base comprises a recess or an opening;
wherein the securing means comprises a locking actuator and a pin; and
wherein the recess or the opening of the section of the base is configured to receive the pin of the securing means.

9. The gripping system of claim 1, further comprising:
a sliding element connected to the end effector;
wherein the arm comprises a rigid frame comprising:
an upper frame element;
a lower frame element; and
a sliding bar connecting the upper frame element and the lower frame element, the sliding bar comprising a guiding element for adjusting the height of the end effector via the sliding element.

10. The gripping system of claim 9, wherein the arm comprises:
lifting bars; and
support bars;
wherein a first end of each of the lifting bars is pivotally attached to a first end of a respective one of the support bars, a second end of each of the support bars is pivotally attached to the lower frame element, and a second end of each of the lifting bars is pivotally attached to the sliding element.

11. The gripping system of claim 10, wherein the actuator comprises a first end fixed to the lower frame element and a second end fixed to the lifting bars.

12. An autonomous guided vehicle (AGV) comprising:
the gripping system of claim 1;
wherein the vehicle comprises the AGV.

13. The AGV of claim 12, further comprising:
a control system to control the actuator based on stored information about a height of a connecting part of a frame of the cart.

14. The AGV of claim 12, wherein the AGV comprises a mobile robot, the mobile robot comprising proximity sensors for detecting obstacles in an environment of the mobile robot.

15. The AGV of claim 14, wherein the mobile robot comprises a body having corners; and
wherein the proximity sensors are on two corners of the body.

16. The AGV of claim 12, wherein the AGV comprises a mobile robot, the mobile robot comprising a navigation system, the navigation system comprising an automatic control and guide system for guiding the mobile robot to a target while avoiding collision with surroundings of the mobile robot.

17. The AGV of claim 12, further comprising:
a sliding element connected to the end effector;
wherein the arm comprises a rigid frame comprising:
an upper frame element;
a lower frame element; and
a sliding bar connecting the upper frame element and the lower frame element, the sliding bar comprising a guiding element for adjusting the height of the end effector via the sliding element.

18. The gripping system of claim 1, wherein the vehicle comprises an autonomous guided vehicle.

19. The gripping system of claim 1, wherein each of the first sensor arm and the second sensor arm comprises an end protruding from a front face of the end effector for interaction with a frame of the cart.

20. The gripping system of claim 19, wherein the end effector comprises:
a hook; and
brackets configured to apply a clamp force on a connecting part of the frame of the cart by moving the hook in a direction of the front face of the end effector using a hook actuator.

* * * * *